G. M. TEW.
VEHICLE TRUCK.
APPLICATION FILED MAR. 17, 1915.
1,182,114.
Patented May 9, 1916.
2 SHEETS—SHEET 2
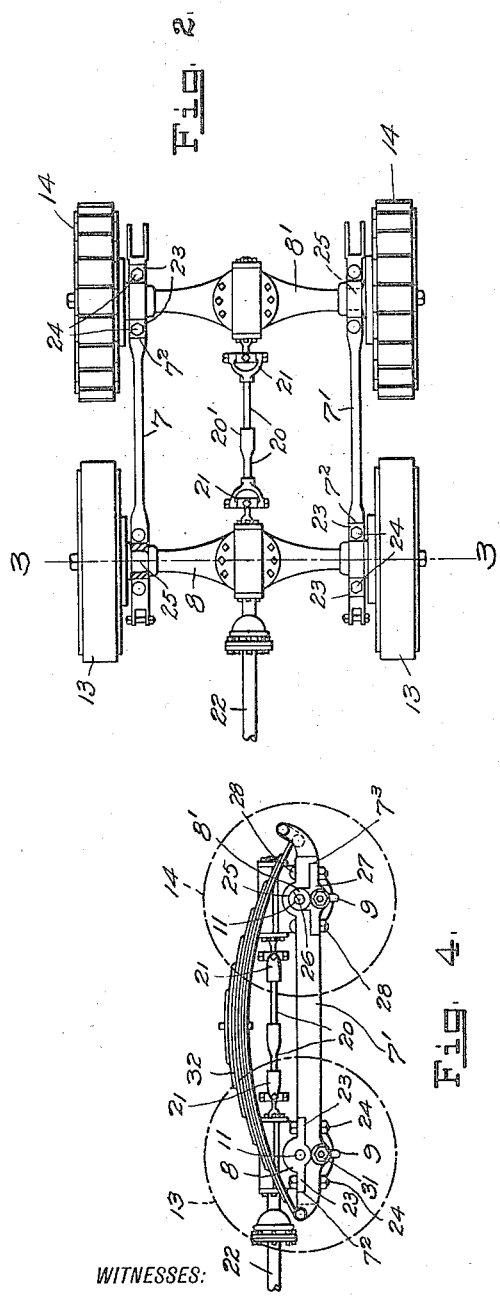
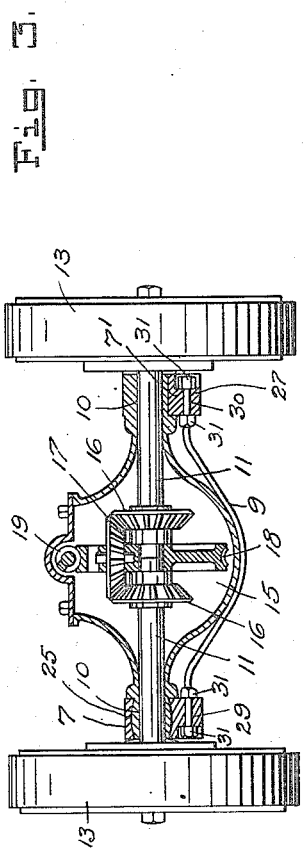
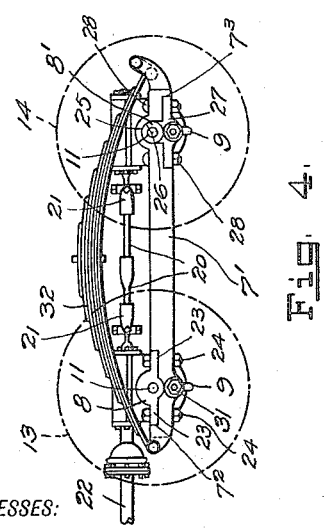
WITNESSES:
Charles L. Reynolds.
E. Peterson.
INVENTOR:
George M. Tew
BY
Pierre Barnes
ATTORNEY

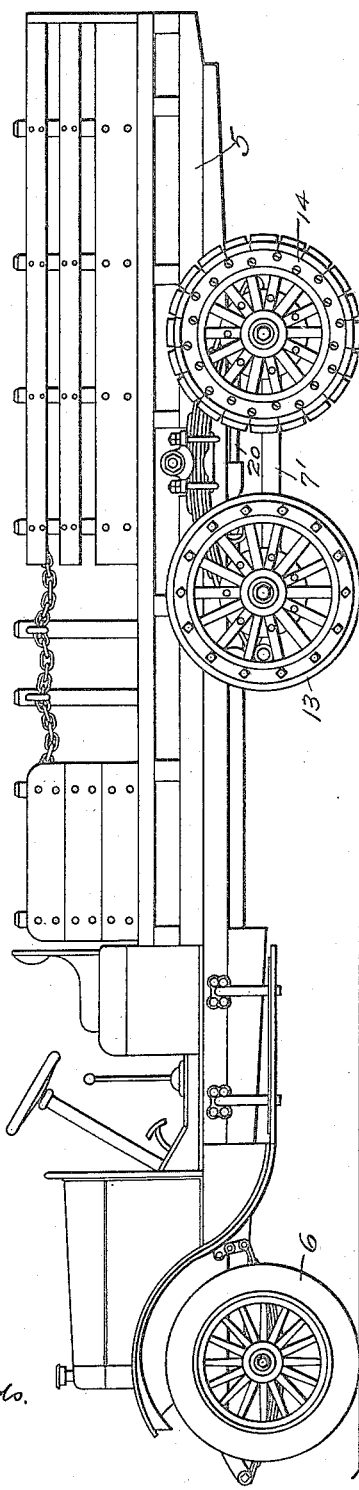

UNITED STATES PATENT OFFICE.

GEORGE M. TEW, OF KIRKLAND, WASHINGTON.

VEHICLE-TRUCK.

1,182,114.   Specification of Letters Patent.   Patented May 9, 1916.

Application filed March 17, 1915. Serial No. 14,901.

*To all whom it may concern:*

Be it known that I, GEORGE M. TEW, a citizen of the United States, residing at Kirkland, in the county of King and State of Washington, have invented certain new and useful Improvements in Vehicle-Trucks, of which the following is a specification.

This invention relates to the running gear of automobiles or other wheeled vehicles. Its object is the improvement in truck construction wherein four wheels are employed to enable the same to be used under the chassis or body of the vehicle to enable it to travel smoothly and have all of the wheels track upon a rough or uneven road-surface.

The invention consists in the peculiar construction of a frame having a certain amount of flexibility.

The invention further consists in the novel construction, arrangement and combinations of parts, as will be hereinafter described and claimed.

In the accompanying drawings, Figure 1 is a side elevation of an automobile with the present invention applied thereto. Fig. 2 is a plan view of the rear truck thereof with portions of the frame in section. Fig. 3 is a transverse sectional view of the truck frame taken through 3—3 of Fig. 2, with the wheels and axle members therefor in elevation. Fig. 4 is a side elevation of Fig. 2, including the body supporting springs and indicating the wheels by broken lines.

In the drawings, 5 designates the body or chassis of an automobile, having under its forward end wheels 6 mounted on hingedly connected stub axles, as usual in automobile practice. Under the rear end of said body is a truck having a frame comprising longitudinal side bars 7 and $7^1$, transverse members 8 and $8^1$ and transverse tie-rods 9. The transverse members 8 and $8^1$ are hollow and provided at their outer ends with boxes 10 for journaling the axle elements 11 to which the wheels 13 and 14 are fixedly secured. Centrally in each of said members is a chamber 15 for housing the differential driving gear of the respective axles. As illustrated in Fig. 3, such driving gear for a pair of axle members may consist of bevel tooth gear-wheels 16 mounted on the alined axle members 11 and driven by a planetary bevel gear wheel 17 which is carried in a gear wheel 18 rotated by a worm 19. The worms for the two axles are coupled to rotate in unison by an intermediate two-part shaft 20 including a telescopic joint $20^1$ and universal joints 21.

22 represents the power shaft extending from the vehicle motor (not shown) to one of said worms. Near an end of each of the members 8 and $8^1$ are provided apertured lugs 23 to seat within recesses $7^2$ of the respective frame-bars and receive bolts 24 or other suitable fastenings for securing the beams to the aforesaid side bars of the frame. Such fastening of said members to the side bars is, however, made at opposite sides of the frame—that is to say, the member 8 is secured to the bar $7^1$ and the other member $8^1$ to the bar 7. Adjacent to the ends of the members 8 and $8^1$ remote from the respective lugs, the members are each formed with a circular peripheral surface 25 which is seated in a similar-shaped bearing 26 provided in a side-bar, and constitutes therewith a swivel connection. For each such bearing is a cap 27 which may be inserted in a recess $7^3$ of a bar and is secured in place by bolts 28.

As illustrated, the tie-rods 9 are disposed beneath the respective members 8 and $8^1$ to support the same. One end of each rod (Fig. 3) extends through a hole 29 provided in a side bar of the frame while the opposite end of the rod extends through a hole 30 provided in a cap 27.

31 represent nuts engaging screw-threads provided at the ends of a tie-rod and bearing against a side bar or the cap secured thereto.

32 represent laminated wagon springs carrying saddles and positioned above each side bar of the truck frame, the extremities of said springs being connected to the ends of the bars in the usual or any suitable manner so as to yield to the relative vertical movements of the chassis.

The operation of the invention may be explained as follows: In traveling upon an uneven road surface, the flexibility of the truck frame due to the swivel connections 25 between the transverse members 8 and $8^1$ and the sidebars 7 and $7^1$ will allow the four wheels to bear upon the road. For example, when the road surface with respect to, say one of the front wheels 13, and the two rear wheels 14, is in a plane, then one end of the frame member 8 is tilted up or lowered to allow the wheel 13 at that end to bear upon the road. Under such conditions, the swivel element 25 of member 8 affords rotary movement thereof relatively to adjacent sidebar 7 which will be swung to an extent about the axis of the other member 8¹ which is compensated for by the swivel connection with the side-bar 7¹.

The members 8 and 8¹ being fixedly secured by bolts 24 to the opposite side bars and with the swivel connections adjacent to the diagonally opposite corners of the frame, the flexure of the frame is, in consequence, distributed substantially throughout the frame structure. The relative movements between the vehicle body and the truck is taken up by the springs.

What I claim, is—

1. A truck for a vehicle comprising a frame having longitudinal bars and transverse members, one of said members being rigidly connected to one of the bars and having a swivel connection with the other bar, the other of said members having a swivel connection with the first mentioned bar and a rigid connection with the other bar, axles extending through the respective members, and wheels for said axles.

2. In a truck, a transverse member rigidly secured at one end to a side bar of the truck frame and having a swivel connection with the side bar at the other side of the truck, axle elements journaled in said member so as to maintain said elements in axial alinement with each other, wheels for the respective axle elements, and a differential speed-drive for the same.

Signed at Seattle, Washington, this 11th day of March, 1915.

GEORGE M. TEW.

Witnesses:
PIERRE BARNES,
E. PETERSON.